US010646999B2

(12) United States Patent
Kundu et al.

(10) Patent No.: US 10,646,999 B2
(45) Date of Patent: May 12, 2020

(54) SYSTEMS AND METHODS FOR DETECTING GRASP POSES FOR HANDLING TARGET OBJECTS

(71) Applicant: Tata Consultancy Services Limited, Mumbai (IN)

(72) Inventors: Olyvia Kundu, Noida (IN); Swagat Kumar, Bangalore (IN); Ehtesham Hassan, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 51 days.

(21) Appl. No.: 16/031,865

(22) Filed: Jul. 10, 2018

(65) Prior Publication Data

US 2019/0022863 A1 Jan. 24, 2019

(30) Foreign Application Priority Data

Jul. 20, 2017 (IN) .............................. 201721025912

(51) Int. Cl.
  *B25J 9/16* (2006.01)
  *G06T 7/70* (2017.01)
  (Continued)

(52) U.S. Cl.
  CPC ........... *B25J 9/1669* (2013.01); *B25J 9/1697* (2013.01); *B25J 19/021* (2013.01); *G06N 3/008* (2013.01);
  (Continued)

(58) Field of Classification Search
  CPC ...... B25J 9/1669; B25J 9/1697; B25J 19/021; G06T 7/70; G06T 7/187; G06T 7/564;
  (Continued)

(56) References Cited

U.S. PATENT DOCUMENTS 6,009,435 A * 12/1999 Taubin .................... G06T 9/001
  345/420
7,765,029 B2 * 7/2010 Fleischer ............. G05B 13/027
  700/250

(Continued)

OTHER PUBLICATIONS

Umar Asif, Segmentation and Classification of Objects from RGB-D Imagery for Robot Grasping, 2016, The University of Western Australia, School of Computer Science and Software Engineering, pp. 1-225 (259) (Year: 2016).*

(Continued)

*Primary Examiner* — Jaime Figueroa
(74) *Attorney, Agent, or Firm* — Finnegan, Henderson, Farabow, Garrett & Dunner LLP (57) ABSTRACT

Systems and methods for detecting grasping poses for handling target objects is disclosed. The system solves problem of grasp pose detection and finding suitable graspable affordance for picking objects from a confined and cluttered space, such as the bins of a rack in a retail warehouse by creating multiple surface segments within bounding box obtained from a neural network based object recognition module. Surface patches are created using a region growing technique in depth space based on surface normals directions. A Gaussian Mixture Model based on color and depth curvature is used to segment surfaces belonging to target object from background, thereby overcoming inaccuracy of object recognition module trained on a smaller dataset resulting in larger bounding boxes for target objects. Target object shape is identified by using empirical rules on surface attributes thereby detecting graspable affordances and poses thus avoiding collision with neighboring objects and grasping objects more successfully.

17 Claims, 7 Drawing Sheets

(51) Int. Cl.
*G06N 3/00* (2006.01)
*G06T 7/187* (2017.01)
*G06T 7/564* (2017.01)
*B25J 19/02* (2006.01)

(52) U.S. Cl.
CPC .............. *G06T 7/187* (2017.01); *G06T 7/564* (2017.01); *G06T 7/70* (2017.01); *G06T 2207/10024* (2013.01); *G06T 2207/10028* (2013.01); *G06T 2207/20076* (2013.01); *G06T 2207/20081* (2013.01); *G06T 2207/20084* (2013.01); *G06T 2207/30108* (2013.01)

(58) Field of Classification Search
CPC . G06T 2207/10024; G06T 2207/20084; G06T 2207/10028; G06T 2207/20081; G06T 2207/30108; G06T 2207/20076; G06N 3/008
USPC .................................................. 700/245, 259
See application file for complete search history.

(56) References Cited

U.S. PATENT DOCUMENTS

| | | | | |
|---|---|---|---|---|
| 10,210,382 | B2* | 2/2019 | Shotton | G06K 9/00369 |
| 2005/0058337 | A1* | 3/2005 | Fujimura | G06K 9/00201 382/159 |
| 2011/0304619 | A1* | 12/2011 | Fu | G06T 17/00 345/420 |
| 2013/0223673 | A1 | 8/2013 | Davis et al. | |
| 2014/0277718 | A1* | 9/2014 | Izhikevich | B25J 9/163 700/250 |
| 2016/0187199 | A1* | 6/2016 | Brunk | G01J 3/2823 348/89 |
| 2016/0210602 | A1* | 7/2016 | Siddique | G06Q 20/0453 |
| 2017/0076438 | A1* | 3/2017 | Kottenstette | G06K 9/00637 |
| 2017/0220887 | A1* | 8/2017 | Fathi | G06K 9/00201 |
| 2018/0268237 | A1* | 9/2018 | Stanimirovic | G06K 9/2018 |

OTHER PUBLICATIONS

Taubin, Gabriel, Estimation of Planar Curves, Surfaces, and Nonplanar Space Curves Defined by Implicit Equations with Applications to Edge and Range Image Segmentation, 1991, IEEE Transactions on Pattern Analysis and Machine Intelligence, vol. 13, No. 11, Nov. 1991, pp. 1115-1138 (Year: 1991).*
Pedro De Souza Asad, Estimating Hand Poses From RGB-D Data, 2016, Coppe UFRJ (Universidad Federal de Rio de Janeiro), pp. 1-78 (Year: 2016).*
Grilli et al, A Review of Point Clouds Segmentation and Classification Algorithms, 2017, 3D Virtual Reconstruction and Visualization of Complex Architectures, Mar. 1-3, 2017, Nafplio, Greece (Year: 2017).*
Varadarajan et al, Object Part Segmentation and Classification in Range Images for Grasping, 2011 15th International Conference on Advanced Robotics (ICAR) Tallinn University of Technology, Tallinn, Estonia, Jun. 20-23, 2011, pp. 21-27 (Year: 2011).*
Zou et al, 3D-PRNN: Generating Shape Primitives With Recurrent Neural Networks, 2017, The IEEE International Conference on Computer Vision (ICCV), 2017, pp. 900-909 (Year: 2017).*
João Gonçalo Pires Ferreira da Silva, Object Segmentation and Classification from RGB-D Data, 2017, Universidade de Coimbra, Portugal, Submitted in Partial Fulfilment of the Requirements for the Degree of Master in Mechanical Engineering in the speciality of Energy and Environment, pp. 1-93 (Year: 2017).*
P. Drews-Jr., et al. (2013). "Novelty detection and segmentation based on Gaussian mixture models: A case study in 3D robotic laser mapping," *Robotics and Autonomous Systems*, vol. 61; No. 12, pp. 1696-1709 (2013).
D. Faria, et al. "Object Shape Retrieval through Gasp Exploration," *4th European Conference on Mobile Robots, ECMR'09*, Sep. 23-25, 2009, 6 pages.

* cited by examiner

FIG. 4A   FIG. 4B   FIG. 4C (a) Cylindrical Object

FIG. 5A (b) Box

SYSTEMS AND METHODS FOR DETECTING GRASP POSES FOR HANDLING TARGET OBJECTS

PRIORITY CLAIM

This U.S. patent application claims priority under 35 U.S.C. § 119 to: India Application No. 201721025912, filed on Jul. 20, 2017. The entire contents of the aforementioned application are incorporated herein by reference.

TECHNICAL FIELD

The disclosure herein generally relate to grasp pose detection systems, and, more particularly, to systems and methods for detecting grasp poses for handling target objects.

BACKGROUND

A robot capable of manipulating its environment is more useful than one that can only perceive things. Such robots will be able to carry out many of our daily chores thereby relieving humans for more creative pursuits. For this to happen, the robots are required to have human-like manipulation and grasping abilities. While the manipulation abilities of robots have matured over the years, grasping still remains a difficult problem which has attracted a lot of attention in the recent past, thanks to the rapid advancement in computer vision and image processing techniques. A number of methods exist in literature that attempt to solve this grasping problem. Some of them use visual features in 2D images to localize graspable regions while others use range data for this purpose, the later becoming more popular owing to the availability of low cost RGBD sensors. Recently, the deep learning based methods are becoming increasingly popular for detecting graspable regions. Most of the existing methods in this field can be broadly classified into two categories. First category, wherein method(s) relies on the availability of accurate geometric information about the object (or a CAD model) making them impractical in several real-world use cases. The second category of methods focus on computing the grasp pose as well as the grasping affordances directly from a RGBD point cloud. Such methods as described above make use of local geometric features to identify graspable regions without knowing the object identity or its accurate 3D geometry. The problem yet remains and is challenging due to several factors like partial occlusion, poor illumination, change of shape and size of deformable objects, scaling as well as restricted field of view for the rack bins.

SUMMARY

Embodiments of the present disclosure present technological improvements as solutions to one or more of the above-mentioned technical problems recognized by the inventors in conventional systems. For example, in one aspect, a processor implemented method for detecting grasping poses for handling target objects is provided. The method comprising: detecting, using a neural network implemented by one or more processors, one or more target objects from a RGB image, wherein the RGB image comprises one or more windows that includes each of the one or more detected target objects; obtaining, from a depth sensor, depth data in the one or more windows; applying, a region growing technique, on the depth data in the one or more windows, to determine one or more surfaces of the one or more target objects in the one or more windows. In an embodiment, wherein the step of determining, using the region growing technique, one or more surfaces of the one or more target objects in the one or more windows comprises: performing, a comparison of surface normal in a surface, between a seed point and one or more neighborhood points; and performing a comparison of (i) an angle between the seed point and one or more neighborhood points and (ii) a threshold.

The method further includes segmenting, using a Gaussian Mixture Model, at least one of one or more object segments and one or more non-object segments from the one or more surfaces. In an embodiment, the step of segmenting, using the Gaussian Mixture Model, at least one of one or more object segments and one or more non-object segments from the one or more surfaces is based on color and curvature of the one or more surfaces pertaining to the at least one of one or more objects segments and one or more non-object segments, and wherein the color comprises hue and saturation, and wherein the curvature for each segment is calculated using a Taubin fitting technique. In an embodiment, the step of segmenting, using a Gaussian Mixture Model, at least one of one or more object segments and one or more non-object segments from the surfaces is based on training data stored in a database.

The method further includes based on the at least one of one or more object segments, determining one or more optimal fit shape primitives for the one or more target objects, wherein the step of determining one or more optimal fit shape primitives comprises applying one or more empirical rules on one or more attributes of the one or more surfaces pertaining to the one or more object segments, wherein the one or more attributes comprises at least one of one or more surface normal directions, one or more surface curvatures, and major and minor axis of the surfaces. The method further comprises detecting, using the one or more optimal fit shape primitives, one or more grasp poses for handling the one or more target objects.

In another aspect, a system for detecting grasping poses for handling target objects is provided. The system comprising: a memory storing instructions; one or more communication interfaces; and one or more hardware processors coupled to the memory via the one or more communication interfaces (106), wherein the one or more hardware processors are configured by the instructions to: detect, using a neural network implemented by the one or more processors, one or more target objects from a RGB image, wherein the RGB image comprises one or more windows that includes each of the one or more detected target objects, obtain, from a depth sensor, depth data in the one or more windows, apply, a region growing technique, on the depth data in the one or more windows, to determine one or more surfaces of the one or more target objects in the one or more windows. In an embodiment, the one or more surfaces of the one or more target objects are determined in the one or more windows by: performing, a comparison of surface normal in a surface, between a seed point and one or more neighborhood points; and performing a comparison of (i) an angle between the seed point and one or more neighborhood points and (ii) a threshold.

The one or more hardware processors are further configured to segment, using a Gaussian Mixture Model, at least one of one or more object segments and one or more non-object segments from the one or more surfaces, based on the at least one of one or more object segments, determine one or more optimal fit shape primitives for the one or more target objects, and detect, using the one or more optimal fit shape primitives, one or more grasp poses for handling the one or more target objects.

In an embodiment, the at least one of one or more object segments and one or more non-object segments are segmented from the one or more surfaces based on color and curvature of the one or more surfaces pertaining to the at least one of one or more objects segments and one or more non-object segments, and wherein the color comprises hue and saturation, wherein the curvature for each segment is calculated using a Taubin fitting technique, and wherein the at least one of one or more object segments and one or more non-object segments are segmented based on training data stored in a database.

In an embodiment, the one or more optimal fit shape primitives for the one or more target objects are determined by applying one or more empirical rules on one or more attributes of the one or more surfaces pertaining to the one or more object segment, wherein the one or more attributes comprises at least one of one or more surface normal directions, one or more surface curvatures, and major and minor axis of the surfaces.

In yet another aspect, one or more non-transitory machine readable information storage mediums comprising one or more instructions is provided. The one or more instructions which when executed by one or more hardware processors causes detecting grasping poses for handling target objects is provided. The instructions comprising: detecting, using a neural network implemented by one or more processors, one or more target objects from a RGB image, wherein the RGB image comprises one or more windows that includes each of the one or more detected target objects; obtaining, from a depth sensor, depth data in the one or more windows; applying, a region growing technique, on the depth data in the one or more windows, to determine one or more surfaces of the one or more target objects in the one or more windows. In an embodiment, wherein the step of determining, using the region growing technique, one or more surfaces of the one or more target objects in the one or more windows comprises: performing, a comparison of surface normal in a surface, between a seed point and one or more neighborhood points; and performing a comparison of (i) an angle between the seed point and one or more neighborhood points and (ii) a threshold.

The instructions further includes segmenting, using a Gaussian Mixture Model, at least one of one or more object segments and one or more non-object segments from the one or more surfaces. In an embodiment, the step of segmenting, using the Gaussian Mixture Model, at least one of one or more object segments and one or more non-object segments from the one or more surfaces is based on color and curvature of the one or more surfaces pertaining to the at least one of one or more objects segments and one or more non-object segments, and wherein the color comprises hue and saturation, and wherein the curvature for each segment is calculated using a Taubin fitting technique. In an embodiment, the step of segmenting, using a Gaussian Mixture Model, at least one of one or more object segments and one or more non-object segments from the surfaces is based on training data stored in a database.

The instructions further include based on the at least one of one or more object segments, determining one or more optimal fit shape primitives for the one or more target objects, wherein the step of determining one or more optimal fit shape primitives comprises applying one or more empirical rules on one or more attributes of the one or more surfaces pertaining to the one or more object segments, wherein the one or more attributes comprises at least one of one or more surface normal directions, one or more surface curvatures, and major and minor axis of the surfaces. The instructions further comprises detecting, using the one or more optimal fit shape primitives, one or more grasp poses for handling the one or more target objects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for detecting grasping poses for handling target objects is disclosed. The system solves the problem of grasp pose detection and finding suitable graspable affordance for picking objects from a confined and cluttered space, such as the bins of a rack in a retail warehouse. The methods involve creating multiple surface segments within the bounding box obtained from a Region-based Convolutional Neural Networks (RCNN) based object recognition module. These surface patches are created using a region growing technique in the depth space based on the discontinuity in the direction of surface normals. A Gaussian Mixture Model based on color (Hue and Saturation) and depth curvature is used to segment the surfaces belonging to the target object from its background. This helps in overcoming the inaccuracy of the object recognition module trained on a smaller example dataset resulting in larger bounding boxes for the target objects. The shape of the target object is identified by using empirical rules on surface attributes such as, direction of surface normal and surface curvature. Finally, suitable graspable affordances and grasp poses are detected using an improved version of a curve fitting algorithm that allows us to avoid collision with neighboring objects and grasping box-type objects more successfully.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Figure 1:
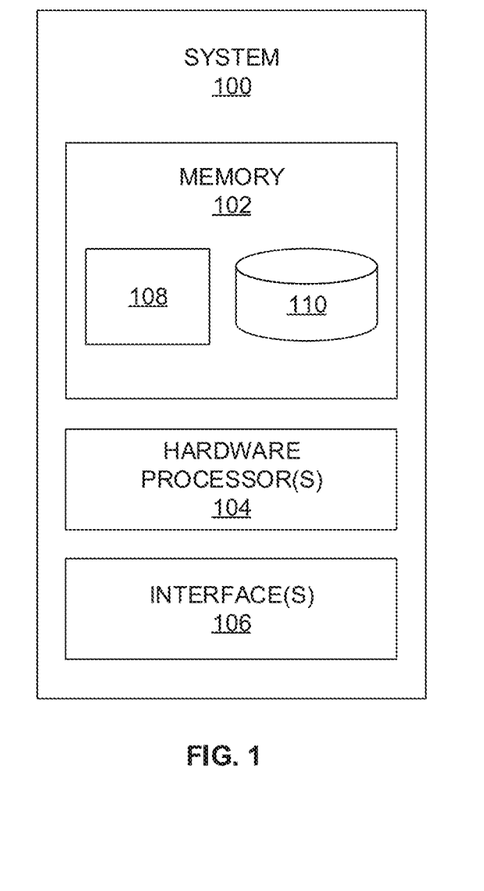
FIG. 1 illustrates an exemplary block diagram of a system for detecting one or more grasp poses for handling target objects according to an embodiment of the present disclosure.

FIG. 1 illustrates an exemplary block diagram of a system 100 for detecting one or more grasp poses for handling target objects according to an embodiment of the present disclosure. The system 100 may also referred as a grasp pose detection system hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
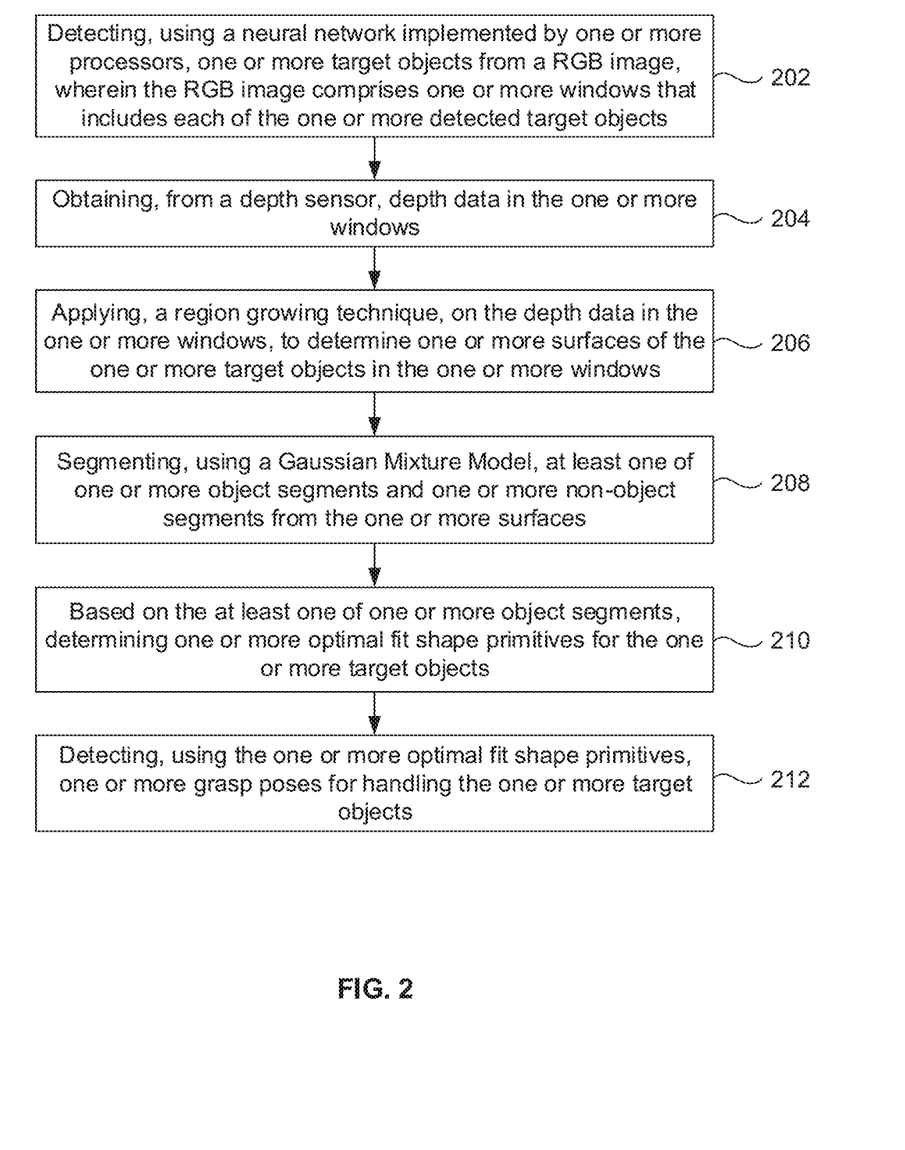
FIG. 2 illustrates an exemplary flow diagram of a method for detecting one or more grasp poses for handling target objects using the system of FIG. 1 in accordance with an embodiment of the present disclosure.
Figure 3A:
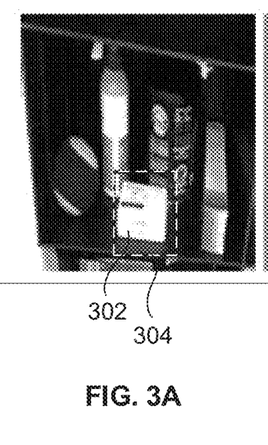
FIG. 3A depicts a bounding box around a detected target object to be handled according to an embodiment of the present disclosure.

FIG. 2, with reference to FIG. 1, illustrates an exemplary flow diagram of a method for detecting one or more grasp poses for handling target objects using the system 100 of FIG. 1 in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, when the system 100 is configured by the instructions via the one or more hardware processors 104, the system 100 performs one or more methodologies described herein. In an embodiment of the present disclosure, at step 202, one or more target objects from a RGB image are detected using a neural network implemented by the one or more hardware processors 104. In an embodiment of the present disclosure, the RGB image comprises one or more windows that includes each of the one or more detected target objects. In an embodiment of the present disclosure, the system 100 implements an object recognition module (stored in modules 108) that provides a bounding box 304 around the detected target object 302 whose size depends on the size of the training dataset (stored in a database 110 of the memory 102). FIG. 3A, with reference to FIGS. 1-2, depicts a bounding box around the detected target object to be handled according to an embodiment of the present disclosure. Larger the training, tighter the bounding box and vice-versa. In an embodiment of the present disclosure, at step 204, the one or more hardware processors 104 obtain, a Kinect sensor device, depth data in the one or more windows. In a preferred embodiment, the depth data may be introduced in the one or more windows.

Figure 3B:
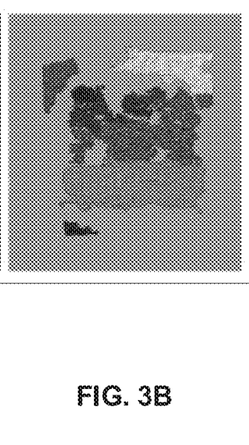
FIG. 3B depicts detected segments region growing inside the bounding box of FIG. 3 according to an embodiment of the present disclosure.

In an embodiment of the present disclosure, at step 206, the one or more hardware processors 104 apply one or more region growing techniques on the depth data in the one or more windows to determine one or more surfaces of the one or more target objects in the one or more windows. In an embodiment of the present disclosure, the system 100 applies the region growing technique(s) based on smoothness constraint. FIG. 3B, with reference to FIGS. 1 through 3A, depicts detected segments region growing inside the bounding box 304 according to an embodiment of the present disclosure. Within this bounding box, various surfaces are created in the depth point cloud using the region growing technique based on surface normals. The one or more surfaces are determined by performing, a comparison of surface normal in a surface, between a seed point and one or more neighborhood points, and a comparison of (i) an angle between the seed point and one or more neighborhood points and (ii) a threshold is performed. In other words, the one or more region growing technique(s) first consider a seed point and then the surface normal between the point and neighborhood points is compared. If the angle between them is less than a threshold, then it is determined that the point belonged to the current region. Then every neighbor act as the current seed and earlier point is removed. The whole process is repeated until all points are checked.

Figure 3C:
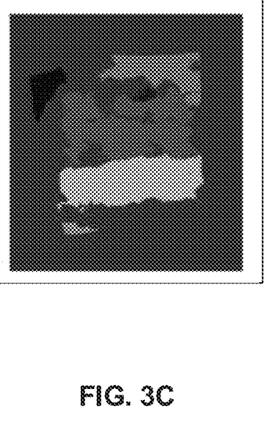
FIG. 3C depicts final segments after applying the merging technique according to an embodiment of the present disclosure.

Again, for a planner face of a box only one segment needs to get detected. But sometimes the region growing technique returns more than one segments. To avoid this kind of situation, two neighborhood segments may be merged with almost similar average surface normal directions. Two neighboring segment are to be merged if the dot product between them is greater than some threshold. This steps enables the proposed method of the present disclosure to make the regions more convenient (as shown in FIGS. 3A-3C).

Suppose the region growing technique(s) returns N number of surface region. For each region $r_i$ wherein i=1 . . . N several properties of each segment are extracted and utilized for further processing. The properties may include for example, surface normal direction ($n_i$), mean of the 3D points belong to the segment ($\mu_{x_i}, \mu_{y_i}, \mu_{z_i}$), variance of surface normal on those points $\sigma_i^2$, first two dominant direction from Principal Component Analysis (PCA), length of the axis along the two dominant directions.

PCA is applied to find the object pose. For each segment, the major and minor axis direction are calculated which is used in further processing.

The window returned by the neural network may not exactly enclose desired object. Sometimes, it may extend beyond that. As a result, some segments which are detected by the region growing technique(s) may not belong to a particular object. For rejecting such type of non-belonging segments, the system 100 implements a Gaussian Mixture Model.

In an embodiment of the present disclosure, at step 208, the one or more hardware processors 104 segment, using a Gaussian Mixture Model (GMM), the one or more object segments and one or more non-object segments from the one or more surfaces. In an embodiment of the present disclosure, the GMM uses color and curvature of the one or more surfaces pertaining to the one or more objects segments and one or more non-object segments wherein the color comprises hue (H) and saturation (S). Based on the experimental data (see Table 1 and Table 2, and graphical representations of FIGS. 5A-5B), it is clear that only color information does not give required differentiation among classes. Therefore, the proposed method of the present disclosure combines color and depth information to get better discrimination which cannot be obtained by using only color value.

The system 100 takes into account the curvature of the segments as a feature. In a preferred embodiment, HS color space is utilized by the system 100 instead of RGB color space. The V channel has been removed to eliminate illumination condition as much as possible. In an embodiment of the present disclosure, the curvature for each segment is calculated using a Taubin fitting technique. A new surface is created whenever a sharp change in the direction of surface normals is observed. The surfaces belonging to the target object is separated from other patches present within the bounding box using a Gaussian Mixture Model (GMM) of the target incorporating color (Hue and Saturation) and depth curvature as features. Since the identity of the object is known from the preceding recognition module, this information could be utilized to segment the target from the rest of background. It is not necessary to have accurate 3D model or complete 3D point cloud of the object for the method to work. Few RGBD images obtained from one or more views could be used as templates for each object. In short, the inaccuracy of the recognition module is compensated by GMM-based segmentation of the target from its background and other classes in the bounding box. Once the surfaces of the target object is separated from the background, a set of empirical rules based on radius of curvature, direction of surface normals etc., are used to identify three primitive shapes—box, cylinder and spheres. The shape identification is carried out in a single step without resorting to complex iterative methods such as RANSAC (Random sample consensus). FIG. 3C, with reference to FIGS. 1 through 3B, depicts final segments after applying the merging technique according to an embodiment of the present disclosure. The small regions detected on the top surface are getting merged and formed one surface as required.

The GMM with three dimensions (H, S, and curvature) is trained from object templates. Hence for each object, two GMM models are trained, one for desired object, and the other one to model background and rest of the classes. To detect whether a segment belongs to a particular class, each point may be tested against the two GMM models. The probability of belongingness of the point is defined by the ratio of likelihood of the pixel in positive class model and the sum of the likelihood in both models. The probability of belongingness of the point may be illustrated by way of following expression:

$$prob = \frac{cc}{cc + bg} \quad (1)$$

Wherein, cc=likelihood of current class, and bg=likelihood of background and other classes.

Figure 4A:
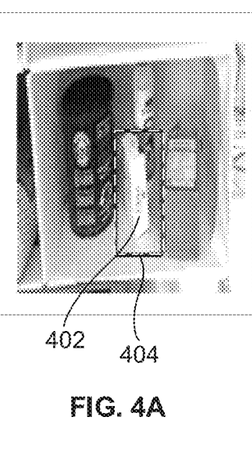
FIG. 4A depicts a Region-based Convolutional Neural Networks (RCNN) bounding box around a detected target object according to an embodiment of the present disclosure.
Figure 4B:
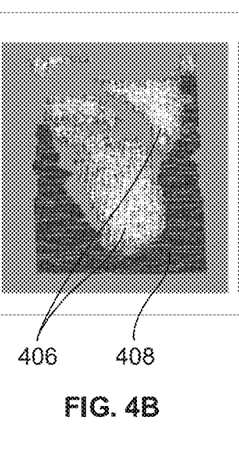
FIG. 4B depicts a Gaussian Mixture Model (GMM) output considering only color as a feature by the system of FIG. 1 according to an embodiment of the present disclosure.
Figure 4C:
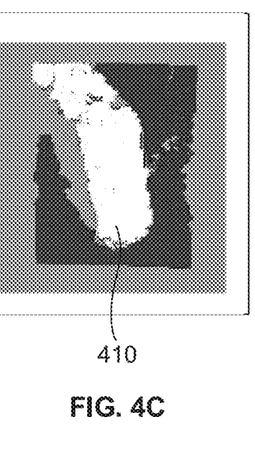
FIG. 4C depicts a segment considering color and curvature as features for shape fitting by the system of FIG. 1 according to an embodiment of the present disclosure.

For testing purpose, a point inside a segment is being considered as object segment when the probability is greater than a threshold value (say 0.5). And when majority of the points inside a segment belong to the class, the segment may be considered that the segment is from that class. Thus, all the segments inside the window (e.g., RCNN window) are tested and are further processed to fit shape primitives. FIG. 4A-4C, with reference to FIGS. 1 through 3C, depict an example of improvement using GMM models with color and curvature by the system 100 of FIG. 1 according to an embodiment of the present disclosure. More particularly, FIG. 4A depicts the Region-based Convolutional Neural Networks (RCNN) bounding box 404 around a detected target object 402 according to an embodiment of the present disclosure, FIG. 4B depicts a Gaussian Mixture Model (GMM) output by the system 100 of FIG. 1 according to an embodiment of the present disclosure. Segment (e.g., white shaded segment—which may be indicated as red in color as output generated by a depth sensor such as a Kinect® sensor device) had been detected as object segment 406 and segments that are not detected are shown as 408 (e.g., dark shaded segments—which may be indicated as blue in color as output generated by a depth sensor such as a Kinect® sensor device). FIG. 4C depicts a segment 410 which is considered for shape fitting by the system 100 of FIG. 1 according to an embodiment of the present disclosure.

The performance of segmentation performed by the system 100 may depend on the quality of training. Therefore, choosing a correct cluster number becomes critical. The embodiments of the present disclosure automatically choose cluster number by running an incremental clustering technique on the training dataset. Only number of closures i.e., K is used to decide number of GMM clusters.

The incremental clustering technique implemented by the system 100 on the training data (or dataset) may be illustrated by way of example as follows:

Incremental Clustering Technique:
1. Input data $d_i$(h, s, c) where i=1, . . . , N, Cluster Center $\mu_k$(h, s, c), size $S_k$ where h=Hue, s=Saturation, c=Curvature
2. Number of cluster K←0

3. Add a cluster $\mu_1(h, s, c) \leftarrow d_i(h, s, c)$ and $S_1=1$, $K=1$
4. For $d_i(h, s, c)$ where $i=2, \ldots, N$
5. Calculate cluster with min distance $p=\mathrm{argmin}(\|\mu_c - d_i\|)$ $c=1, \ldots, K$
6. Include in the cluster if $d_{min}(p)$<threshold $$\text{Update } \mu_p(h, s, c) \leftarrow \frac{S_k \mu_p(h, s, c) + d_i(h, s, c)}{S_k + 1}$$

Figure 5A:
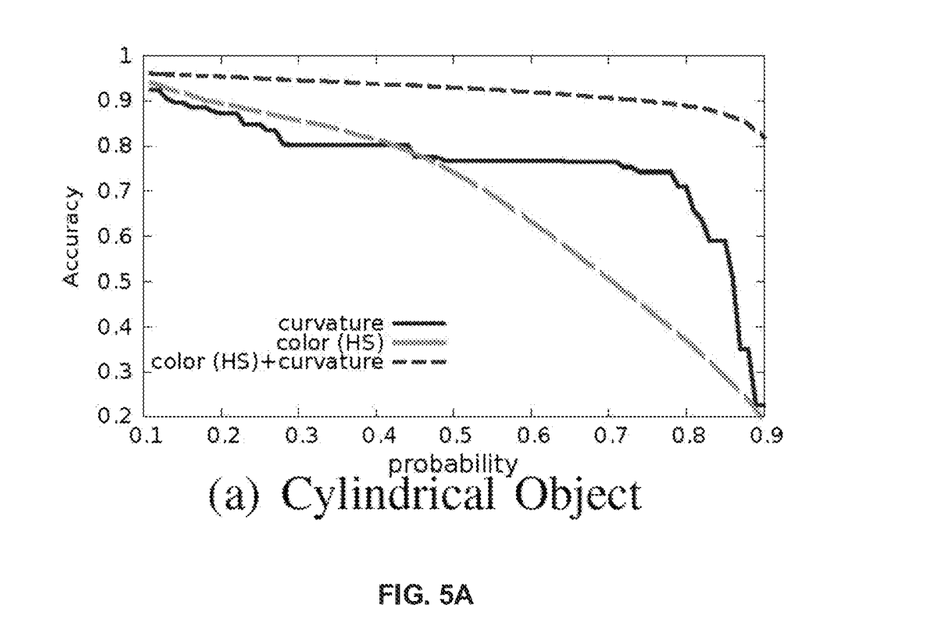
FIGS. 5A-5B illustrate a graphical representation depicting accuracy of detection of two objects—(a) cylinder and (b) box, using Gaussian Mixture model based on color, curvature and combination of both according to an embodiment of the present disclosure.
Figure 5B:
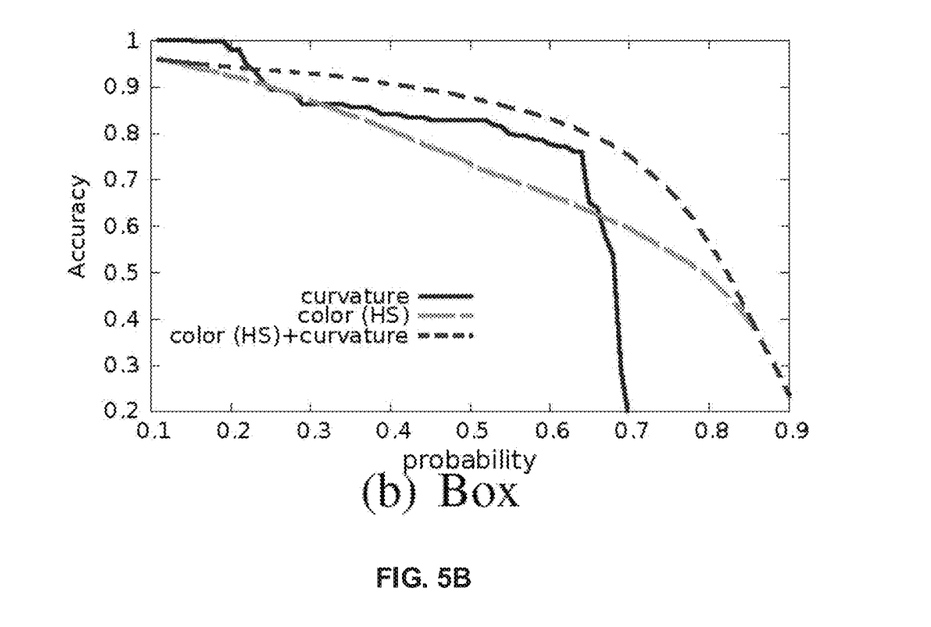

8. Otherwise create a new cluster $\mu_{K+1}(h, s, c) \leftarrow d_i(h, s, c)$ and $K=K+1$ FIGS. 5A-5B, with reference to FIGS. 1 through 4C, illustrate a graphical representation depicting accuracy of detection of two objects—(a) cylinder and (b) box, using Gaussian Mixture model based on color, curvature and combination of both according to an embodiment of the present disclosure. FIGS. 5A-5B show that combining color with depth curvature information provides better discrimination compared to using either color or curvature alone. More particularly, FIGS. 5A-5B show the accuracy $$\left( \frac{\sum TruePositive + \sum TrueNegative}{\sum TotalSamples} \right)$$

graphical representations for two objects obtained using GMM that uses only color, only curvature and a combination of both. As it can be seen, the combination of color and curvature provide higher accuracy compared to the other two cases. For cylindrical and spherical primitives all the three channels (hue, saturation, and curvature) can give differentiation and therefore overall effect is much more higher. In case of flat surface of the box, the curvature matches with other box type of object and flat walls of bin (background). So, only two color channel is left to give required discrimination. As the color information is not as reliable as curvature, the GMM for box type of objects does not perform as well as other two shapes.

In an embodiment of the present disclosure, at step 210, the one or more hardware processors 104 determine one or more optimal fit shape primitives for the one or more target objects based on the one or more object segments. In an embodiment of the present disclosure, the one or more optimal fit shape primitives are determined by applying one or more empirical rules (stored in the memory 102 and implemented by the system 100 in real time) on one or more attributes of the one or more surfaces pertaining to the one or more object segments wherein the one or more attributes comprises at least one of one or more normal directions, one or more curvatures, and major and minor axis of the surfaces.

Using segments from the GMM output, the present disclosure fits 3-D shape primitives. The embodiments of the present disclosure disclose techniques for fitting three basis 3-D shape primitives, for example, box, cylinder, and sphere. As discussed above, the decision on which shape primitive is to be fitted is automatically taken by the system 100 based on curvature and variance of the segments. It is to be understood that cylinder and spherical object share more similarities compared to box object. So, at the first level, the embodiments of the present disclosure have attempted to separate cylinder and sphere from box shape primitives and decide between cylinder and sphere. The decision is based on the following characteristics of the surface to be fitted, which are described by way of examples:

Curvature Estimation:

Curvature plays a significant role in different steps of the present disclosure as depth data is much more reliable compared to color information. The system 100 applies a Taubin fitting technique which roughly approximates local surfaces efficiently with the help of 3D Cartesian coordinates (x, y, z). A quadric equation can be fitted on those neighborhood points and a final curvature of that segment is identified based on the median curvature of the neighborhood.

Variance Calculation:

Sometimes the curvature alone may not be enough to take the decision of shape primitive fitting. The variance of the surface normals is an important factor to decide whether a surface is flat or curved. As for a plane surface, the surface normal direction does not deviate much as compared to curved surface, and variance of a flat surface will be much smaller than that of curved surface. If a region $r_i$ has $M_i$ point, then its standard deviation can be calculated by way of following expression:

$$\sigma_{r_i} = E(n_j^2) - (E(n_j))^2 \text{ where, } j=1 \ldots M_i \quad (2)$$

The decision is taken based on the segment which has highest probability against GMM. If the one or more segments have almost same probability then biggest among them may be considered.

Following are the criteria for fitting shape primitives:
radius ≤0.05 m—fit cylinder or sphere
radius ≥0.1 m—fit box
0.05 m radius 0.1 m {σ≥0.1-fitcylinder√/sphere σ≤0.1-fitbox}

Cylinder and Sphere Primitive:

3D primitive fitting is incorporate to make grasping tasks easier by using the full information above object shape. Shape fitting is much more simple problem most of the surfaces of the object are properly visible. But for occlusion and lack of visibility often the input data does not contain that much clarity and information which makes the fitting problem harder.

For cylinder and sphere primitive fitting, the embodiments of the present disclosure considers curved surfaces to determine parameters of the primitives. To differentiate between cylindrical and sphere shape primitive, the property is used such that surface normals of a spherical surface meet on a point whereas for cylindrical surface normals meet on a line. So, if the surface normals of any spherical surface is extended opposite to surface normal direction by an amount equal to radius then they will meet on a point. However, with real-life data, they do not meet on a single point but lie within a small region around the center of the sphere. To mean of the extended points gives the center point of the sphere. On the other hand, for a cylindrical surface if the same technique is applied with the surface normal they line on a line passed through the center of the cylinder and the length is almost equal to length of the cylinder. This helps to obtain the length and axis direction of the cylinder which is the value of the radius already obtained from the curvature estimation technique.

Box Primitive:

If the surface properties do not match with cylinder or sphere, the system 100 may automatically consider for box shape fitting. To be part of the box type object, two neighbor segments have to have the following properties:

1. Surface normal for both surface have to be perpendicular.
2. Either of two axis (major, minor) of both of the segments has to be in the same direction.
3. Length of the matched axis for both segment should be almost similar (or near similar).
   To check the above third condition, length of the axis whose direction are similar is considered. The ratio of these should be as close as possible.

Referring back to steps of FIG. 2, in an embodiment of the present disclosure, at step 212, the one or more hardware processors 104 detect, using the one or more optimal fit shape primitives, one or more grasp poses for handling the one or more target objects. Initially, the center and radius of grasping as the center and radius of cylinder/sphere were set. Any radius greater than a maximum distances between fingers (maxHandAperture), while they are fully open has been discarded. The axis was set to perpendicular to both cylinder axis and normal direction. There should be enough space (handle gap) around a handle for grasping. A search is performed in a small spherical region around the center with radius equal to maxHandAperture and handle gap combined only to find whether that is a valid graspable region. So, to be a valid handle the cylindrical shell should contain enough points inside it and very less or few points outside upto a certain distance equal to handle gap. The primitive fitting technique already gave us a radius, but due to uneven nature of surface (subject to target object), some points may lie outside the radius. To prevent this kind of situation, prior art techniques have increased the length of the radius until there were few points in the handle gap. This prior art technique has filed where some points from other object lie within the radius and no points in handle gap. As segmentation has been done using GMM in the earlier stage, it was known to the proposed method that which segment (points) belongs to the object and which are not. To be a valid handle, the number of points that do not belong to the target object has to be very minimal. By including this condition, the embodiments of the present disclosure has enabled the proposed method to eliminate some false handles. A search was carried out for handle from the center of the primitive for cylindrical primitives. If handle was not found at the center, the proposed technique searched in both direction along cylinder axis as show in FIG. 6A-6B. Spherical primitives only defined by its center (a 3D point) and its radius. It does not have any axis like cylindrical primitives. So the search for handles has been done by rotating the axis on a plane with normal along average surface normal direction. Once a handle has been found, the proposed technique returns that handle parameters to be used by the system 100 (or by a robot).

Figure 6A:
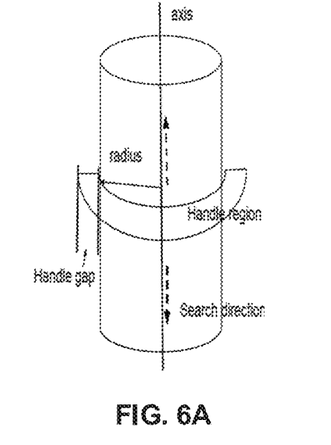
FIGS. 6A-6C depict prototypes for cylinder, sphere, and box respectively according to an embodiment of the present disclosure.
Figure 6B:
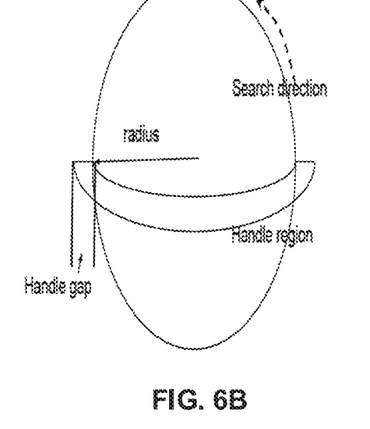
Figure 6C:
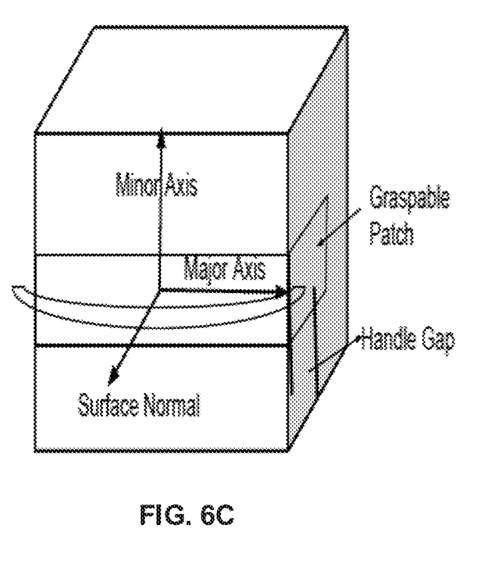

The grasp localization for box primitives has been done by searching a patch on a side (face) as shown in FIG. 6C. For example, a box is to be grasped using the front surface with surface normal direction towards the robot or user. Then ideally there must exist two surfaces in the perpendicular direction with the first surface. So, a patch with the above criteria has been searched on each visible face and is returned if found. The proposed technique input is point cloud data from a single view. Both the two perpendicular surface may not be visible from a single view. Therefore, the embodiments of the present disclosure enable the proposed method to find with one perpendicular surface at least. At first, the minor axis direction of the front surface has been taken as robot hand orientation and the searching is continued. There must be enough space around a handle to fit the robot hand for grasping. All the visible surfaces are searched for handles and corresponding parameters are provided to the robot.

FIGS. 6A-6C, with reference to FIGS. 1 through 5B, depict prototypes for cylinder and sphere according to an embodiment of the present disclosure. All the surface normals for sphere converged to a point but the surface normal for cylinder fall on a line in 3D. This property may be (or is) used to differentiate between first two shape primitives (see FIGS. 6A-6B). FIG. 6C is a prototype of box primitive according to an embodiment of the present disclosure. More particularly, FIGS. 6A-6C illustrates prototype to explain grasp localization on the primitives. To be a valid handle there should be enough gap around the region. The number of points in the handle gap that does not belong to object should be very less. The radius of the handle is the curvature of the primitive (for sphere and cylinder) and corresponding axis length for box type of primitives.

Figure 7:
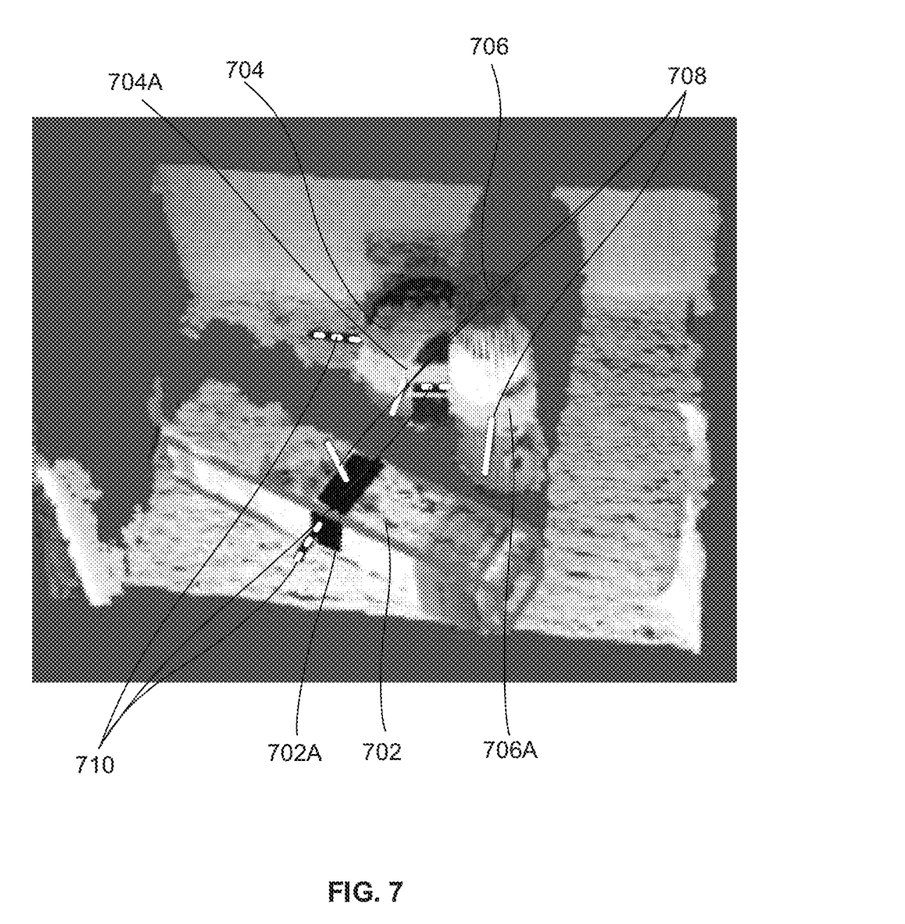
FIG. 7 depicts results of the proposed methodology according to an embodiment of the present disclosure.

The embodiments of the present disclosure have enabled the proposed method to focus on returning at least one best handle per object. The best handle (or optimal grasp pose(s)) is chosen based on number of points that does not belong to object. The proposed method finds only one graspable region for sphere and cylinder and one region per visible face of box if possible. In case of box, multiple handles may be returned as some grasping handle may not be reached by robot due to hardware limitation and obstacle. In such cases, other reachable handles may be tried. FIG. 7, with reference to FIGS. 1 through 6C, depict results of the proposed methodology according to an embodiment of the present disclosure. Three shape primitives box 702, sphere 704, cylinder 706 respectively. Handles are shown by 702A, 704A, and 706A respectively. For each handle the normal direction is indicated by 708 and robot hand orientation 710.

Experimental Results:

Experiments were carried out with household objects to evaluate the performance of the proposed method of the present disclosure. The results are calculated by considering as many poses as possible. The proposed shape fitting technique can handle cases where the target object is occluded to some extent. The experiments showed that geometry based 3D shape primitives fitting has promising results in real processing time. As described earlier, GMM with color and curvature feature improves the performance significantly. The GMM was trained using 150 frames per object, in an embodiment of the present disclosure.

Shape Primitives:

Shape primitive fitting results is illustrated in Table 1 below by way of examples for the household objects. The physical parameters for cylinder (radius, length, axis, and center), sphere (radius, center), and box (length, width, height, and corresponding directions) are compared with the corresponding values from the proposed technique. Table 1 summarizes number of times each of primitive shape has been detected.

TABLE 1

| Object | #frame | #pose | #cylinder | #sphere | #box | % Correct |
| --- | --- | --- | --- | --- | --- | --- |
| Toothpaste | 40 | 10 | 1 | 0 | 37 | 92.5 |
| Soap | 50 | 10 | 1 | 1 | 46 | 92 |
| TissuePaper | 40 | 10 | 2 | 0 | 34 | 85 |
| Bulb | 50 | 10 | 3 | 0 | 45 | 90 |
| CareMate | 60 | 5 | 57 | 0 | 3 | 95 |

It is evident from the above table 1 that the accuracy of fitting correct primitive is quite high and also indifferent of pose.

Grasping:

Table 2 presents final shape primitive and grasping results. The proposed technique was tested separately with single-object and multiple-object workspace. For single object primitive fitting, detection and segmentation steps were skipped. Table 2 in particular depicts accuracy (%) of shape primitive (P) and grasping (H).

TABLE 2

| Scene | Box | | Cylinder | | Sphere | |
|---|---|---|---|---|---|---|
| | P | H | P | H | P | H |
| Single-Object | 90 | 89.3 | 95 | 94.4 | 94 | 93 |
| Cluttered | 84 | 83.6 | 92 | 91 | 91 | 90.2 |

It is evident from the first row of the above Table 2, that the proposed primitive fit and grasp localization step performs with high accuracy for all three type of shapes.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (200), comprising:

detecting (202), using a neural network implemented by one or more processors, one or more target objects from an RGB image, wherein the RGB image comprises one or more windows that includes each of the one or more detected target objects;

obtaining (204), from a depth sensor, depth data in the one or more windows;

applying (206), a region growing technique, on the depth data in the one or more windows, to determine one or more surfaces of the one or more target objects in the one or more windows, wherein the one or more surfaces of the one or more target objects are determined in the one or more windows by:

performing, a comparison of surface normal in a surface, between a seed point and one or more neighborhood points; and performing a comparison of (i) an angle between the seed point and one or more neighborhood points and (ii) a threshold;

segmenting (208), using a Gaussian Mixture Model, at least one of one or more object segments and one or more non-object segments from the one or more surfaces;

based on the at least one of one or more object segments, determining (210) one or more optimal fit shape primitives for the one or more target objects; and detecting (212), using the one or more optimal fit shape primitives, one or more grasp poses for handling the one or more target objects.

2. The processor implemented method of claim 1, wherein the step of segmenting, using the Gaussian Mixture Model, at least one of one or more object segments and one or more non-object segments from the one or more surfaces is based on color and curvature of the one or more surfaces pertaining to the at least one of one or more objects segments and one or more non-object segments, and wherein the color comprises hue and saturation.

3. The processor implemented method of claim 2, wherein the curvature for each segment is calculated using a Taubin fitting technique.

4. The processor implemented method of claim 2, wherein the step of segmenting, using a Gaussian Mixture Model, at least one of one or more object segments and one or more non-object segments from the surfaces is based on training data stored in a database.

5. The processor implemented method of claim 1, wherein the step of determining one or more optimal fit shape primitives comprises applying one or more empirical rules on one or more attributes of the one or more surfaces pertaining to the one or more object segments.

6. The processor implemented method of claim 5, wherein the one or more attributes comprises at least one of one or more surface normal directions, one or more surface curvatures, and major and minor axis of the surfaces.

7. A system (100) comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
detect, using a neural network implemented by the one or more processors (104), one or more target objects from an RGB image, wherein the RGB image comprises one or more windows that includes each of the one or more detected target objects;
obtain, from a depth sensor, depth data in the one or more windows;
apply, a region growing technique, on the depth data in the one or more windows, to determine one or more surfaces of the one or more target objects in the one or more windows, wherein the one or more surfaces of the one or more target objects are determined in the one or more windows by:
performing, a comparison of surface normal in a surface, between a seed point and one or more neighborhood points; and
performing a comparison of (i) an angle between the seed point and one or more neighborhood points and (ii) a threshold;
segment, using a Gaussian Mixture Model, at least one of one or more object segments and one or more non-object segments from the one or more surfaces;
based on the at least one of one or more object segments, determine one or more optimal fit shape primitives for the one or more target objects; and
detect, using the one or more optimal fit shape primitives, one or more grasp poses for handling the one or more target objects.

8. The system of claim 7, wherein the at least one of one or more object segments and one or more non-object segments are segmented from the one or more surfaces based on color and curvature of the one or more surfaces pertaining to the at least one of one or more objects segments and one or more non-object segments, and wherein the color comprises hue and saturation.

9. The system of claim 8, wherein the curvature for each segment is calculated using a Taubin fitting technique.

10. The system of claim 8, wherein the at least one of one or more object segments and one or more non-object segments are segmented based on training data stored in a database.

11. The system of claim 8, wherein the one or more optimal fit shape primitives for the one or more target objects are determined by applying one or more empirical rules on one or more attributes of the one or more surfaces pertaining to the one or more object segments.

12. The system of 11, wherein the one or more attributes comprises at least one of one or more surface normal directions, one or more surface curvatures, and major and minor axis of the surfaces.

13. One or more non-transitory machine-readable information storage mediums comprising one or more instructions which when executed by one or more hardware processors causes:
detecting, using a neural network implemented by the one or more processors, one or more target objects from an RGB image, wherein the RGB image comprises one or more windows that includes each of the one or more detected target objects;
obtaining, from a depth sensor, depth data in the one or more windows;
applying, a region growing technique, on the depth data in the one or more windows, to determine one or more surfaces of the one or more target objects in the one or more windows, wherein the one or more surfaces of the one or more target objects are determined in the one or more windows by:
performing, a comparison of surface normal in a surface, between a seed point and one or more neighborhood points; and
performing a comparison of (i) an angle between the seed point and one or more neighborhood points and (ii) a threshold;
segmenting, using a Gaussian Mixture Model, at least one of one or more object segments and one or more non-object segments from the one or more surfaces;
based on the at least one of one or more object segments, determining one or more optimal fit shape primitives for the one or more target objects; and
detecting, using the one or more optimal fit shape primitives, one or more grasp poses for handling the one or more target objects.

14. The one or more non-transitory machine-readable information storage mediums of claim 13, wherein the step of segmenting, using the Gaussian Mixture Model, at least one of one or more object segments and one or more non-object segments from the one or more surfaces is based on color and curvature of the one or more surfaces pertaining to the at least one of one or more objects segments and one or more non-object segments, wherein the color comprises hue and saturation, and wherein the curvature for each segment is calculated using a Taubin fitting technique.

15. The one or more non-transitory machine-readable information storage mediums of claim 14, wherein the step of segmenting, using a Gaussian Mixture Model, at least one of one or more object segments and one or more non-object segments from the surfaces is based on training data stored in a database.

16. The one or more non-transitory machine-readable information storage mediums of claim 13, wherein the step of determining one or more optimal fit shape primitives comprises applying one or more empirical rules on one or more attributes of the one or more surfaces pertaining to the one or more object segments.

17. The one or more non-transitory machine-readable information storage mediums of claim 16, wherein the one or more attributes comprises at least one of one or more surface normal directions, one or more surface curvatures, and major and minor axis of the surfaces.

* * * * *